United States Patent
Kohl

(10) Patent No.: US 11,140,104 B2
(45) Date of Patent: Oct. 5, 2021

(54) METHOD FOR COMMUNICATING MESSAGES BETWEEN AT LEAST ONE SENDER AND AT LEAST ONE RECIPIENT VIA MESSAGING SERVICES THAT ARE COMMUNICATIVELY CONNECTED WITH AN INTEGRATION PLATFORM

(71) Applicant: adviqo GmbH, Berlin (DE)

(72) Inventor: Ulrich Walter Kohl, Berlin (DE)

(73) Assignee: adviqo GmbH, Berlin (DE)

( * ) Notice: Subject to any disclaimer, the term of this patent is extended or adjusted under 35 U.S.C. 154(b) by 0 days.

(21) Appl. No.: 16/904,699

(22) Filed: Jun. 18, 2020

(65) Prior Publication Data

US 2020/0403946 A1   Dec. 24, 2020

(30) Foreign Application Priority Data

Jun. 19, 2019   (DE) ..................... 10 2019 116 705.1

(51) Int. Cl.
| | |
|---|---|
| *G06F 15/16* | (2006.01) |
| *H04L 12/58* | (2006.01) |
| *G06F 16/25* | (2019.01) |
| *H04L 12/66* | (2006.01) |
| *H04L 29/08* | (2006.01) |

(52) U.S. Cl.
CPC .......... *H04L 51/046* (2013.01); *G06F 16/252* (2019.01); *H04L 12/66* (2013.01); *H04L 67/104* (2013.01)

(58) Field of Classification Search
CPC ..... H04L 51/046; H04L 12/66; H04L 67/104; G06F 16/252

USPC .......................................................... 709/206
See application file for complete search history.

(56) References Cited

U.S. PATENT DOCUMENTS

| | | | |
|---|---|---|---|
| 8,108,470 B2 * | 1/2012 | Lai .......................... | H04L 51/14 709/206 |
| 10,587,551 B1 * | 3/2020 | Acton .................... | H04W 12/37 |
| 10,749,834 B2 * | 8/2020 | Yamasaki ............. | G06F 16/583 |
| 10,924,447 B2 * | 2/2021 | Kim ........................ | H04L 51/08 |
| 2004/0267942 A1 | 12/2004 | Maes | |
| 2006/0020666 A1 * | 1/2006 | Lai .......................... | H04L 51/14 709/206 |

(Continued)

*Primary Examiner* — Moustafa M Meky
(74) *Attorney, Agent, or Firm* — Dority & Manning, P.A.

(57) ABSTRACT

The invention relates to a method for communicating by means of messaging service messages between at least one sender (4) and at least one recipient (5, 6) via at least one messaging service (11, 12, 13, 15), wherein the messaging service (11, 12, 13, 15) is or will be communicatively connected with an integration platform (1) and a message is sent from the sender (4) by means of the messaging service (11, 12, 13) using a sender-specific sender messaging service identity and a recipient-specific sender messaging service identity to the integration platform (19[sic:1]), a stored sender-specific or recipient-specific platform identity is assigned in the integration platform (1) to the sender-specific sender messaging service identity and to the recipient-specific sender messaging service identity respectively, a recipient-specific recipient identity associated with the recipient specific platform identity is identified, and the message is passed from the integration platform to the recipient-specific recipient identity. The invention additionally relates to a system for carrying out the method according to the invention.

9 Claims, 2 Drawing Sheets

(56) References Cited

U.S. PATENT DOCUMENTS

| | | | |
|---|---|---|---|
| 2006/0150119 A1* | 7/2006 | Chesnais | G06F 16/243 |
| | | | 715/810 |
| 2007/0055666 A1* | 3/2007 | Newbould | G06Q 30/02 |
| 2007/0160077 A1 | 7/2007 | Altberg et al. | |
| 2009/0083380 A1 | 3/2009 | Smyth et al. | |
| 2009/0138564 A1* | 5/2009 | Beddus | H04L 69/329 |
| | | | 709/206 |
| 2014/0207679 A1 | 7/2014 | Cho | |
| 2015/0149286 A1* | 5/2015 | Brown, II | G06Q 30/0261 |
| | | | 705/14.58 |
| 2016/0277707 A1* | 9/2016 | Sugaya | G06F 21/32 |
| 2017/0264586 A1* | 9/2017 | Yamasaki | H04L 51/32 |
| 2018/0014169 A1* | 1/2018 | Cheung | G06Q 10/10 |
| 2018/0225365 A1* | 8/2018 | Altaf | G06F 16/3344 |
| 2018/0367495 A1* | 12/2018 | Kim | H04L 51/32 |
| 2020/0019609 A1* | 1/2020 | Yu | G06F 40/186 |
| 2020/0274916 A1* | 8/2020 | Choi | H04L 51/34 |

* cited by examiner

| Platform Identity | General User Data | | | |
|---|---|---|---|---|
| | Name | Account Number | Price | UserAgent |
| Top_Consultant | Carol Meyer | DE12300... | 1.99 | WeApp |
| Bob | Bob Müller | DE48200... | 2.59 | Backend |
| Alice | Alice Schmitt | DE334711... | 0 | Whats-Chat |

| Platform Identity | Messaging Service | Messaging Service Identity | Specific Messaging Service Characteristics ||||
|---|---|---|---|---|---|---|
| | | | Name | Picture | Telephone Number | ... |
| Top_Consultant | weApp | 0171 1235813 | Cmey | | 01711235813 | |
| Top_Consultant | Whats-Chat | 0173 3971235 | Top_Carol | | | |
| Bob | Whats-Chat | 0173 3971234 | | | | |
| Alice | Whats-Chat | 0171 4711007 | Alice_S | | | |

Fig. 3

METHOD FOR COMMUNICATING MESSAGES BETWEEN AT LEAST ONE SENDER AND AT LEAST ONE RECIPIENT VIA MESSAGING SERVICES THAT ARE COMMUNICATIVELY CONNECTED WITH AN INTEGRATION PLATFORM

The present application is based on and claims priority to German Patent Application No. 10 2019 116 705.1, having a filing date of Jun. 19, 2019, which is incorporated by reference herein.

The present invention relates to a method for communicating by means of messaging system messages between at least one sender and at least one recipient via at least one messaging system service, in which method a possibility for a gateway is provided between different messaging system services, in addition, the present invention relates to a system for carrying out the method according to the invention.

Messaging services are enjoying increasing popularity. They have previously functioned primarily for P2P communication (peer-to-peer communication) between private persons, or for communication between persons and unknown contact persons in companies. In a P2P communication, the messaging service is used symmetrically between a communication initiator or sender and a communication recipient. Both use the same user interface or mobile app. In general, both communicating parties know one another personally or at least have their respective contact data. Often, the contact of the counterpart must be entered into the contact database of the end device, i.e., must also already be known before the communication process.

In business use, companies, usually the customer service department, may also be contacted by their customers via messaging. Multiple agents, who respond to customer questions, may then be contacted using a single messaging system contact. In this case, the exact person, with whom the customer communicates, is unimportant to the customer. It may be the case in many dialogues that the person, with whom a customer is communicating, changes, even through the same communication partner is always addressed.

In comparison with telephone services via telephone networks or telephone systems, which look back over a substantially longer history, messaging-based services are still structured very simply. In addition, the messaging service world is also highly fragmented. Telephone providers generally work according to a uniform communication standard. Therefore, their telephone services and networks are compatible, and connected to one another, for example, as is the case with landlines/ISDN, mobile networks, and voice-over-IR. In this way, callers from one network of a provider A may call up subscribers in another network of provider B. In contrast to this, messaging services only function within a proprietary provider system, accordingly, multiple, similar systems exist in parallel to one another and have no mutual connectivity.

The telephone network allows the use and operation of call centers, thus, the possibility of contacting a plurality of agents at one single phone number (that of the call center). In contrast, messaging services have offered only 1:1 communication over the course of their historic development. Only in more recent times were possibilities developed (e.g., via Whatsapp Business API 2018) for connecting external backend systems, which are operated by multiple agents.

In the case of telephones, there are so-called Premium Rate Services (PRS) with so-called PRS telephone numbers, by means of which it is possible to monetize certain services, for example, via contracts with telephone services providers to carry out payment by the person called. The payment is collected via the telephone invoice of the caller. However, it has not been known until now to monetize communication via messaging service systems.

In the context of these types of PRS services, the PRS telephone numbers may function as aliases for the actual, geographic telephone numbers of the person called, while the actual telephone numbers of specific subscribers remain unknown to the caller. ACD and IVR systems were introduced to control the customers calling in, to support the persons called, and for intelligent routing of calls. Natural persons and legal entities may have multiple telephone numbers via which they may be contacted, according to their roles. In contrast, up until now, messaging services are linked to one online identity, which is generally also linked to one single (usually mobile) telephone number.

Telephone services take place synchronously by means of voice communication in realtime, while messaging system services comprise only asynchronous and time shifted text, voice, and image communication; known methods for added value services from the technical area of telephony cannot simply be adopted by messaging services to create a similar spectrum of services.

It is the object of the present invention to provide a method and a system, with which a messaging-based communication across messaging services is possible, optionally while providing added value services like premium rate services.

This problem is solved according to the invention by a method and by a system with the features according to the respective independent claims. Advantageous refinements of the present invention are the subject matter of the dependent claims.

Correspondingly, the invention provides a method for communication by means of messaging service messages between at least one sender and at least one recipient via at least one messaging service. The messaging service is or will be communicatively connected to an integration platform. A message from the sender is transmitted to the integration platform by means of the messaging service using a sender-specific sender messaging service identity and a recipient-specific sender messaging service identity. A registered sender-specific or recipient-specific platform identity is assigned in the integration platform to the sender-specific sender messaging service identity and the recipient-specific sender messaging service identity respectively. A recipient-specific recipient identity assigned to the recipient-specific platform identity is determined and the message is passed from the integration platform to the recipient-specific recipient identity.

Within the context of the present description of the invention, the terms "sender" and "recipient" are understood to be participants in the method according to the invention. The sender is the communication initiator within the framework of the demand. The roles assigned to these participants as sender and recipient may change over the course of the method, for example, one participate is the sender in a communication taking place in one direction and the other participant is thereby the recipient, while in communication taking place in the reverse direction, these roles are reversed and the first participant is the recipient and the second participant is the sender. In the case of group communication, a sender contacts a multitude of recipients usually practically simultaneously, each group member may send messages in the group, which all others receive. The sender may be, in particular, a natural person, like a customer, a service recipient, a person seeking advice, or an added value service recipient, who sends a first request or message to the recipient. The recipient may be, in particular, different individual contacts, for example, in the form of natural persons, like consultants or employees of a service provider, or automatic or automated systems of the service provider for processing a sender-side query, or a trademark or a service of the service provider. The recipient may be contactable in particular by means of different messaging services or by means of a web platform. The sender/service recipient may initiate a communication link via his/her own messaging service to all recipients, in particular to all individual contacts/consultants of the service provider, regardless of their respectively used messaging service. Additional services may thereby be requested and supplied, which was previously known only in the technical area of added value telephony.

The present invention may relate, in particular, to facilitating a communication via a messaging service with added value services, like they are known, in particular, in the context of telephone added value services from telephone networks. Different messaging services or messaging systems are thereby supplemented and connected by means of the integration platform, which may form an integration and transaction platform (ITP) depending on the embodiment of the invention. In the following, the term ITP relates both to an integration platform and also to an integration and transaction platform.

The sender/service recipient uses a messaging service of his/her choice, wherein, however, it is irrelevant whether the recipient/service provider uses the same or another messaging service or an interface, also designated as an administrator interface directly on the ITP, which, e.g., permits him/her to maintain an overview over many parallel communication processes without having to use one messenger app him/herself.

One particular advantage of one embodiment of the invention consists in that, in the messaging service application of the sender/service recipient, the individual contact of the recipient/service provider communicating with the sender appears like a direct messaging service contact, and the communication appears to the sender like a normal messaging service conversation. In reality, however, the communication channel of the sender-side messaging system ends at the integration platform (ITP)).

The integration platform (ITP) effects on its side the additional communication with the individual contact of the recipient/service provider, in particular via another channel, e.g., another messaging service. In particular, the ITP forwards a request by the sender/service recipient to the individual contact of the recipient/service provider and routes their responses back to the sender/service recipient.

In addition, the ITP may control the communication and enrich it with additional services, like payments. Additional methods and data are necessary for this purpose, which are supplied or stored in the ITP. The ITP uses a database for this purpose, which preferably contains all identities of all participants and their properties, and maps the identities and the actually used messaging systems onto one another. In addition, the ITP implements the methods for connecting the participants with one another. Additional, participant-specific data, which is necessary for additional functions of the platform, may be stored in the database.

It is advantageous if identities at least one identity) for both communication participants, the sender/service recipient and the recipient/individual contact of the service provider, are registered in the respectively used messaging services. These types of identities are designated in the context of the invention as messaging service identities or individual identities. The ITP may supplement these messaging service identities in each case with a separate system identity, which is designated as the platform identity in the context of the invention. The messaging service identities and the platform identities may be, however do not necessarily have to be, the same; acting using pseudonyms may be facilitated in a desired way in the context of the invention. The unambiguousness and the unambiguous mapping of the identities in the systems are relevant.

According to one embodiment of the invention, groups are used in the implementation of the messaging service integration. In this case, it is sufficient if one recipient-specific platform identity, thus a service provider profile, is established for a service provider, their services, companies, or brands, while providing recipient-specific recipient messaging service identities may be omitted. In this way, it is not necessary to establish a real or virtual account/profile with a recipient messaging service identity for each individual contact/recipient, so that considerable costs may be saved. For each relationship between two people of sender/customer with recipient/individual contact/consultant, a group of two is established in this embodiment. Thus, it is always clear to which specific contact partner a message is addressed.

According to the invention, the identities, in particular the messaging service identities, of the individual contacts of the service provider may be virtual. In case the messaging service used on the part of the recipient/service provider normally links participant identities to actual, physical objects or actual properties, like mobile numbers of IMEIs, they may be linked to physical objects/properties of the ITP operator (e.g., mobile numbers under its control) according to one embodiment of the invention. The linking of respective identities may be carried out either by registering the user, by maintaining the profile data, and/or by sending messages to the platform. According to one embodiment of the invention, a recipient-specific recipient messaging service identity of the messaging service, or from another messaging service, is determined as the recipient-specific recipient identity, and the message is passed from the integration platform to the recipient-specific recipient messaging service identity. According to another embodiment, the message may be designed to carry out an in-band control, and contains at least one keyword for identifying the recipient which keyword is assigned in the integration platform to the recipient-specific platform identity.

One embodiment particularly advantageous for business uses provides that one (single) recipient-specific platform identity is or will be stored on the integration platform for the recipient and is coupled to multiple recipient-specific messaging service identities for the recipient. In this way, multiple individual contacts of a service provider may be implemented particularly easily in the method according to the invention and are contactable via a single ID. Correspondingly, in another embodiment, one (single) sender-specific platform identity is or will be stored on the integration platform for the sender and is coupled to multiple sender-specific messaging service identities for the sender.

To implement a gateway function according to one embodiment of the invention, thus a communication between different messaging services or between a messaging service and direct users of the ITP, a service provider is registered on the ITP or in another system integrated into the ITP, for example, using a service provider profile or account. In addition, the service provider must have virtual identities in the messaging service used that are linked to its account or profile, in particular virtual identities for each individual contact. In contrast, a service recipient is usually required to have an existing user account at his/her messaging service, otherwise, they have to generate one.

In the case of the ITP, messages incoming via the messaging service of the service recipient are assigned and transmitted in the ITP to the virtual account of the service provider. A communication in the opposite direction, thus responses from the service provider to the service recipient, are correspondingly transmitted back to the messaging service of the service recipient.

According to one embodiment of the invention, processing a transaction service is possible. For this purpose, the service recipient also has a user account with certain transaction-specific data, for example, address data, account data, payment information, etc. A corresponding service contract preferably exists between the service recipient and the service provider.

Alternatively, a service contract may exist between the operator of the ITP and the service recipient, and the operator may carry out the settlement of the value-added services rendered. A corresponding proportion may then be paid to the service provider by the operator of the ITP. Due to the invention, costs may be configured to be substantially more flexible overall than is known from the area of telephone or SMS added-value services. By separating media use and billing, conventional billing models, for example, "costs per time unit" or "costs per message", may be used. In the latter case, messages may be distinguished in particular according to sent versus received, or may also be aggregated and combined in any way. An automatic or automated credit-based billing (prepayment) is also included in the scope of the invention. As another innovation, costs for added-value services rendered or to be rendered may be handled between the parties via the messaging channel (in-band) and individually invoiced. This may be carried out, in particular, via an exchange of messages using keywords, which are interpreted by the ITP platform.

The invention additionally comprises a system for communicating by means of messaging system messages between at least one sender and at least one recipient via at least one messaging service, which system is designed to carry out a method according to the invention, in particular a method according to one of the appended claims. The system may, in particular, comprise an integration platform having a control logic (in particular comprising software or formed by software) and a database with assignments of sender-specific and recipient-specific messaging service identities and platform identities. The integration platform may additionally be designed for communicating with the database and have at least one messaging service interface (API) for communicating with a messaging service.

The interfaces to the connected messaging services may, in particular, be equipped and designed to send and/or to receive messages. In addition, the interfaces may be equipped and designed to carry out methods for mapping the identities from the connected systems. According to one embodiment, an interface may be natively able to receive messages for different service providers. Alternatively, a single interface is instantiated for each potential service provider. This applies analogously to sending: an interface may be able to receive different messaging service identities of different service providers, or a single interface is instantiated for each potential service provider. An interface may be designed programmatically or it may comprise physical devices, like smartphones. The interfaces may additionally rely on normal user interfaces.

According to another embodiment of the invention, the ITP has its own operator interface. According to one embodiment of the invention, the recipient-specific recipient identity is linked to an administrator interface. In addition, the message is passed to the administrator interface. This embodiment of the invention may, in particular, enable the recipient/service provider to communicate, in particular to send and receive messages, directly on the ITP and not by using messaging services. The operator interface may function, in particular, for facilitating an administration of the recipient/service provider and functions, and for entering data and relationships in particular.

According to one embodiment, the ITP comprises a database, which preferably contains all of the data, which is necessary for operations, about the connected systems, the identities and their relationships and also information about them, like contactabilities. The database is preferably a relational database, a document-oriented database, or a NoSQL database.

It may also be stated that a platform is provided according to the invention, which represents a gateway between multiple separate messaging systems or messaging services. The invention permits communication across messaging service providers in a transparent way, without the communicating parties, thus service recipients and service providers, noticing this. The two communicating parties, in particular persons, do not have to mutually know each other and/or their actual identities or personal telephone numbers, but instead may recognize only the respective pseudonyms in the context of the invention. The pure communication function may be or will be expanded by potentials for control and billing. Through in-band exchange of control instructions, in particular control words, and/or control messages, a multiplexing of a messaging profile onto multiple contacts, in particular persons, contactable by this means, may be achieved on the one hand, and on the other hand a negotiation of prices may be facilitated.

As a whole, similar functionalities and, in particular, added value services may be created by the invention in the technical area of messaging services, as they are already known in the area of telephony. Thus, the invention provides a foundation for using messaging service communication in a professional and/or commercial environment.

The method and the system according to the invention enable, in particular, a gateway between different messaging services and transparent communication across messaging services. Pseudonymization is possible, in addition to a unique contactability of a person without disclosure of the true identity. In addition, the invention offers, in addition to the potential for decoupling telephone numbers and identities, a potential for multiplexing identities, so that a group of persons may be covered by one messaging service account, and still be individually addressable. One substantial advantage is the central control of the communication flow and the processing of added-value services by means of the invention.

Additional features of the invention result from the claims, the figures, and the description of the figures. The features and combinations of features, previously listed in the description, and the features and combinations of features subsequently mentioned in the description of the figures and/or shown only in the figures are applicable, not only in the respectively indicated combination, but also in other combinations or alone, without leaving the scope of the invention. Thus, embodiments of the invention are also to be considered as comprised and disclosed, which are not explicitly shown or explained in the figures; however arise and are producible by separate combinations of features or from the explained embodiments. Embodiments and combinations of features are also to be considered disclosed that thus do not have all features of one of the originally formulated independent claims. In addition, embodiments and combinations of features are to be considered disclosed, in particular by the embodiments explained above, which exceed or deviate from the combinations of features represented in the references of the claims.

The invention is now explained in greater detail basis of preferred embodiments and with reference to the appended drawings.

FIG. 3 shows in tabular representation a structure by way of example of another part of a database for use in the system and in the method according to the invention.

Identical and functionally identical elements are provided with identical reference numerals in the figures.

Figures 1, 2:
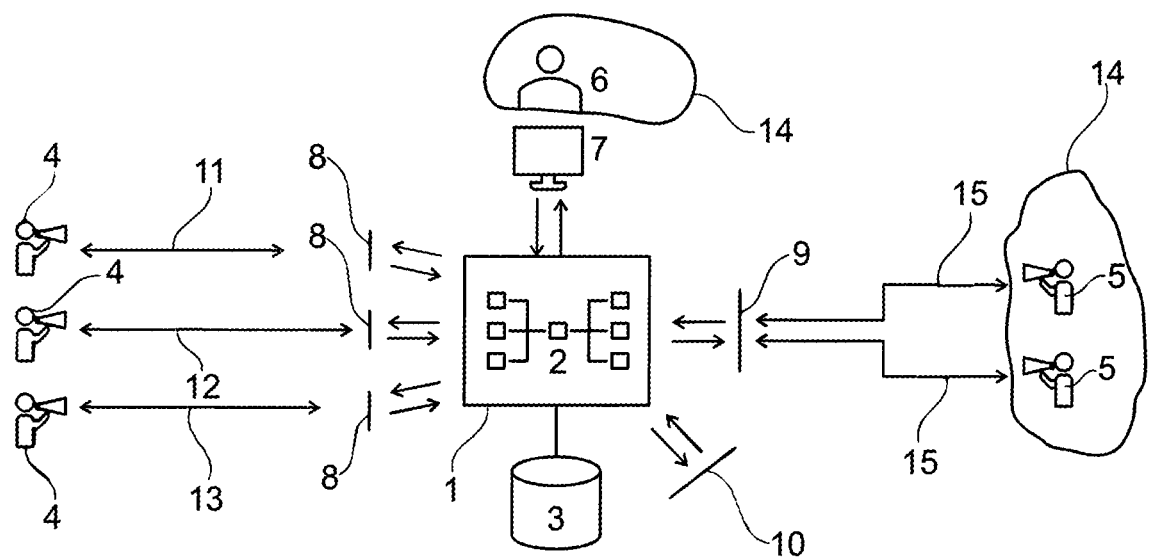
FIG. 1 shows a schematic depiction of a system according to the present invention.
FIG. 2 shows in tabular representation a structure by way of example of a part of a database for use in the system and in the method according to the invention.

FIG. 1 shows a system according to the invention in a schematic depiction. This comprises as a central component an integration platform 1, which is designed as an integration and transaction platform 1 (ITP) and contains a control logic 2. Integration and transaction platform 1 is coupled in a communicative way to a database 3 or has such a database 3, which is likewise a component of the system in the embodiment shown.

Integration and transaction platform 1 is integrated, for example, into a computing unit or is formed by the same. To effect a communication data flow with senders 4, which in this case represent service recipients 4, the ITP comprises first interfaces 8 (API) which enable a data exchange with different messaging services 11, 12, 13. To effect a communication data flow with a recipient 5, in this case individual contacts 5 in the form of consultants 5 of a service provider 14, integration and transaction platform 1 comprises at least one second interface 9 (API), which enables a data exchange with at least one messaging service 15. Messaging service 15 may be identical with or different from one of messaging services 11, 12, 13. Alternatively or in addition to the at least one second interface 9, integration and transaction platform 1 comprises a web user interface 7, also designated as an administrator interface 7, via which a data exchange may be carried out with another individual contact 6, for example in the form of a consultant 6 of service provider 14. Finally, integration and transaction platform 1 comprises another interface 10 for effecting additional functions.

Service recipients 4 may be, in particular, customers 4 or users. These communicate with ITP 1 as communication initiators via their messaging service (11, 12, 13), which is installed, for example, on a mobile radio device of customer 4, via one of first interfaces 8, which may be designated as individual messaging service API 8. The ITP uses data contained in database 3 for controlling control logic 2. Advisers 5, 6 work either on the web user interface 7 or via the integrated API 9 of other messaging service 15 in the example. For the sake of simplicity, service recipients 4 are designated in the subsequent description as senders 4 (as these send the first message) and individual contact 5, 6 of service provider 14 is designated as recipient 5, 6 (as these receive the first message).

ITP 1 is connected via its interfaces 8, 9 to all integrated messaging services 11, 12, 13, 15 in this method. On the basis of data from database 3, ITP 1 carries out a routing of messages from sender 4 (customer messages) to recipients 5, 6 of service provider 14 and vice versa, and may, in case this is desired in control logic 2, integrate added-value functions, like a time control or a payment function, into the routing function via interface 10, or may link to the same.

The calls to messaging services 11, 12, 13, or 15 appear schematically as follows:

Interface 8, identification of sender 4 (service recipient/user 4) via API Instance:
    weApp7_API_Bob_Receive (sender, message) # delivers to Bob a message "message" from "sender" via WeApp
    weApp7_API_Bob_Send (recipient, message) # sends via WeApp the message "message" from Bob to "recipient"

Interface 9, identification of recipient 5, 6 (individual contact 5, 6 of service provider 14) via an API parameter:
    WhatsChat8_API_Receive (sender, recipient, message) # delivers to "recipient" a message "message" from "sender" via WhatsChat
    WhatsChat8_API_Send (sender, recipient, message) # sends the message "message" from "sender" to "recipient" via WhatsChat The exemplary design and the structure of database 3 are evident on the basis of the tables shown in FIGS. 2 and 3. Database 3 accordingly comprises a primary table 16 and a secondary table 17. Primary table 16 contains central information across messaging services about the participants, in this case in the form of service recipients 4 as senders 4 and individual contacts 5, 6 of service provider 14 as recipients 5, 6, in particular their platform identity, which may also be designated as the leading identity or system-wide identity. In addition, additional information, like addresses, prices, a schedule, and/or payment information may be contained in primary table 16.

All messaging-service-specific data, in particular the local messaging service identity (identifying data) and associated profile data, are stored per messaging service in secondary table 17. All messaging-service-specific data of all messaging service identities of a participant/person are or will be linked in primary table 16 and supplemented with the platform identity. Each participant/person may be found and specifically addressed using this platform identity. It is particularly advantageous that all communication requests may be mapped onto one another using this database structure.

A sender 4 (service recipient/customer 4), who wants to contact a recipient 5, 6 (individual contact/consultant 5, 6) of service provider 14 via a messaging service, addresses their (virtual) profile, which means their recipient-specific sender messaging service identity, on messaging service 11, 12, 13 used by the sender, and sends the message. This is then delivered to ITP 1 via messaging-service specific API 8. ITP 1 determines, based on the recipient-specific sender messaging service identity, the recipient-specific platform identity and the channel, and if necessary, the recipient-specific recipient messaging service identity via which addressed individual contact/consultant 5, 6 may actually be contacted, and forwards the message there. Individual contact/consultant 5, 6 receives the message via their messaging service 15, or via backend system 7, and may respond to it.

For the reverse transmission of the response from individual contact/consultant 5, 6 to service recipient/customer 4, this person, thus original sender 4, must be identified. According to the invention, there are multiple variants for this purpose:

1. Sender 4 has their own virtual ITP identity on consultant messaging service 15, then the reverse transmission functions like the sending transmission in the reverse direction.

2. Individual contact/consultant 5, 6 works using backend 7 (and without a messaging service), then the addressing logic is included in backend 7 which stored service recipient/user 4 as original sender 4 of the message.

3. The messages between ITP 1 and individual contact/consultant 5, 6 are supplemented by an in-band control logic (comparable with keywords from short code SMS), in which the first word of the message identifies the actual communication partner.

In this case, the message to individual contact/consultant 5, 6 as the recipient would contain, e.g., as the first word, a code name or code number for service recipient/user 4 as the original sender, this word is again in the first position in the response.

It should be emphasized that respective recipients/consultants 5, 6 require only a maximum of one personal messaging service account, or even no account, if they work directly on backend 7 of ITP 1, and yet may have a profile or an identity on all messaging services 11, 12, 13, 15 and may be contacted there. The recipient-specific messaging service identities are therefore virtual, from this viewpoint, and controlled by the platform operator not, as is usually the case, by the person behind the identity. This is an important feature for companies that provide or employ service agents (comparable with an office telephone number that remains with the company in the case that the employee is terminated).

Control logic 2 is responsible for forwarding the messages in ITP 1, and if necessary, for control and additional functions that are carried out or to be carried out. An incoming message contains the messaging-service-specific field "recipient". Control logic 2 searches secondary table 17 for the entry for this field (using the profile name or the messaging service identity) and thus also obtains the leading identity or platform identity of individual contact 5, 6, as the recipient. Thus, the entry of individual contact 5, 6 may be found particularly easily in primary table 16, in that the selected user agent (target messaging service or web backend) of recipient 5, 6 is entered, on which user agent recipient 5, 6 wants to receive and respond to the message. ITP 1 then sends the message to recipient 5, 6 via recipient messaging service API 9 or via recipient backend 7. In the case that communication takes place via messaging service 15 and sender 4 has a virtual profile on recipient messaging service 15, then this is specified as the sender profile, so that a response to this profile may be treated precisely like the request (via look-up and address resolution). In the case that ITP backend 7 is used, backend 7 itself ensures that the response entered regarding this is passed on to original sender 4. In the case that sender 4 does not have a virtual profile and the request is sent via messaging service 11, 12, 13 to recipient 5, 6 using the profile of ITP 1, then control logic 2 adds an identifier to the message text (e.g., the leading identity of the primary table), which consultant 5, 6 returns in the response. In this way, ITP 1 may assign the response precisely back to original sender 4 and deliver via messaging service 11, 12, 13 entered in primary table 16.

In addition to basic gateway and switching functions, control logic 2 also manages additional internal systems, connected via API 10, which influence or supplement the logic. A connected payment system may accomplish that the forwarding of a message costs a certain amount, which is immediately collected during the forwarding. A time management system may effect that a schedule of a consultant 5, 6 is maintained, so that, for example, this person does not receive any messages outside of certain times, or that a consultant 5, 6 may have only one concurrent dialogue. In addition, a syntactic or semantic control of the messages falls within the scope of the invention, so that, for example, messages with certain contents are not transmitted.

In the following, the functionality of the invention will be illustrated by way of an example scenario. The scenario describes the situation, in which platform 1, which transmits sender/end customers 4 (communication initiators) to recipients/consultants 5, 6 (communication recipients), provides the communicating parties 4, 5, 6 with a messaging service communication that requires payment. Parties 4, 5, 6 do not thereby have to use the same messaging service 11, 12, 13, 15. Imaginary messaging services, WhatsChat and WeApp, are discussed by way of example. The specific configuration of the messaging services is therefore not relevant. However, it is important that these are two different messaging services.

End customer/communication initiator 4, with the name Alice, uses messaging service 11 WhatsChat. She is registered there with her actual telephone number 0171 4711007. In contrast, she is registered as "Alice" on platform 1 under the platform identity "Alice" with additional payment information and her telephone number.

Consultant/communication recipient 6, with the name Bob, works directly on platform 1 via backend 7. He has the virtual messaging service identity 0173 3971234 for the messaging service WhatsChat and the platform identity "Bob" on platform 1.

Consultant/communication recipient 5, with the name Carol, uses messaging service 15 WeApp, where she has the virtual messaging service identity 0171 1235813 In another messaging service WhatsChat, she has the virtual messaging service identity 0173 3971235. On the platform, she is managed with the platform identity "Top_Consultant". In addition, Carol has an actual or personal registration in the messaging service WeApp under her real mobile telephone number 0151 2244550.

All participants 4, 5, 6 are separately registered on the systems that they use. Consultants 5, 6 use virtual identities on the messaging service platforms, via which they want to be contactable, e.g., in the establishment of their consultant identities on platform 1.

Alice is registered at WhatsChat with her mobile telephone number and on platform 1 as Alice. She also stores her mobile telephone number there and her payment information, and accepts the GTC of platform 1.

Bob is registered on platform 1 as Bob and additionally obtained the additional virtual identity 0173 3971234 at WhatsChat. He declined to obtain an additional virtual identity at WeApp. The platform links the two identities. He has stored his account information for payments.

Carol is registered on platform 1 as Top_Consultant and additionally obtained the two additional virtual identities 0173 3971234 at WhatsChat and 0171 1235813 at WeApp. Platform 1 links Carol's three identities using secondary table 17. Carol configures platform 1 such that she would be able to work in her own WeApp client. She has stored her account information for payments.

All data points are stored in the platform and linked to one another.

Alice would like to be advised through the messaging service. She knows the virtual WhatsChat number for her consultant, Bob, e.g., from a customer-oriented information website on platform 1 or from a print or television ad. She may then send a message directly to Bob's virtual number using her normal WhatsChat client (her messaging service). This message is delivered to platform 1 via the normal messaging service channel under Alice's mobile telephone number. The platform only has to search in database 3 for the customer registration as to which customer 4 is registered with this sending number and which consultant 5, 6 is registered with the addressed (virtual) recipient number. Platform 1 identifies Alice and Bob. Bob works on a backoffice interface 7 of platform 1 itself, therefore Alice's request is displayed to him there and he may also respond to her there. Platform 1 then sends the response via WhatsChat back to Alice and charges the agreed upon fee or collects the amount.

Alice may also conduct a consultation with Carol in the same way. The two dialogues are displayed for her in the standard view of the messaging service client. The messages from Alice to Carol are, however, sent from Alice to platform 1 via WhatsChat, and from platform 1 to Carol's personal identity at WeApp using Alice's virtual WeApp identity. Carol receives and responds to the messages using the WeApp client. The response initially returns to the platform using WeApp, the platform again maps the identities onto each other and Alice is identified as the actual recipient of the WhatsChat identity, to whom the response is forwarded.

As soon as a communication link is established between two partners 4, 5, 6, another message may be sent at any time and from either side via each messaging service client, and charged according to the contractual relationship and billing method.

Alternatively to the virtual telephone numbers for participants 4, 5, 6 (e.g., in the case that these are not supported by messaging service providers), in-band identification may also be used, in that the participants themselves incorporate their own and the partner's identity into the message (or the platform inserts them), comparable with key words in SMS short codes.

An example dialogue is realized as follows using in-band addressing and cost accounting: The following message from Alice is sent to the central telephone number for platform 1:

"Top_Consultant What will the weather be like tomorrow?"

This text is entered as a message under Alice's sender address via WhatsChat. Platform 1 identifies from database 3 which identity stands behind the pseudonym "Top_Consultant", which is in the first position of the message as a key word, and assigns it to the identity 0171 1235813 at WeApp. The message is transmitted there with the inserted sender identity as follows:

"Alice What will the weather be like tomorrow?"

Carol initially responds to the question with the in-band cost notification:

"Alice Fee 2 Euro"

This message is transmitted to platform 1 via WeApp, correspondingly converted, and sent via WhatsChat to Alice.

"Top_Consultant Fee 2 Euro"

Alice confirms this message:

"Top_Consultant OK"

The message is forwarded to Carol analogously as described above. Carol now knows for assurance that her response will be paid and sends a response.

"Alice Sunny at 25 degrees, cloudy but dry in the evening".

This message is transmitted back again, the platform withdraws 2 Euros from Alice's account and pays Carol the agreed upon portion/percentage.

The invention claimed is:

1. Method for communicating by means of messaging service messages between at least one sender and at least one recipient via at least one messaging service, wherein the messaging services are or will be communicatively connected with an integration platform and a message is sent from the sender by means of the messaging service using a sender-specific sender messaging service identity and a recipient-specific sender messaging service identity to the integration platform, a stored sender-specific or recipient-specific platform identity is assigned in the integration platform to the sender-specific sender messaging service identity and to the recipient-specific sender messaging service identity respectively, a recipient-specific recipient identity associated with the recipient specific platform identity is identified and the message is passed from the integration platform to the recipient-specific recipient identity.

2. Method according to claim 1,
   characterized in that
   the recipient-specific recipient identity is linked to an operator interface and the message is passed to the operator interface.

3. Method according to claim 1,
   characterized in that
   a recipient-specific recipient messaging service identity of the messaging service or another messaging service is identified as the recipient-specific recipient identity and the message is passed from the integration platform to the recipient-specific recipient messaging service identity.

4. Method according to claim 1,
   characterized in that
   the message is designed for carrying out an in-band control and contains at least one key word for identifying the recipient, said key word is assigned to the recipient specific platform identity in the integration platform.

5. Method according to claim 1,
   characterized in that
   a recipient-specific platform identity is or will be stored on integration platform for the recipient and is coupled to multiple recipient-specific messaging service identities for the recipient.

6. Method according to claim 1,
   characterized in that
   a sender-specific platform identity is or will be stored on the integration platform for the sender and is coupled to multiple sender-specific messaging service identities for the sender.

7. System for communicating by means of messaging service messages between at least one sender and at least one recipient via at least one messaging service, said system is designed to carry out a method according to claim 1.

8. System according to claim 7,
   characterized in that
   this comprises an integration platform comprising a control logic and a database comprising assignments of sender-specific and recipient-specific messaging service identities and platform identities, wherein the integration platform is designed for communicating with the database, and has at least one messaging service interface for communicating with a messaging service.

9. System according to claim 7, characterized in that the database is a relational database, a document-oriented database, or a NoSQL database.

* * * * *